UNITED STATES PATENT OFFICE.

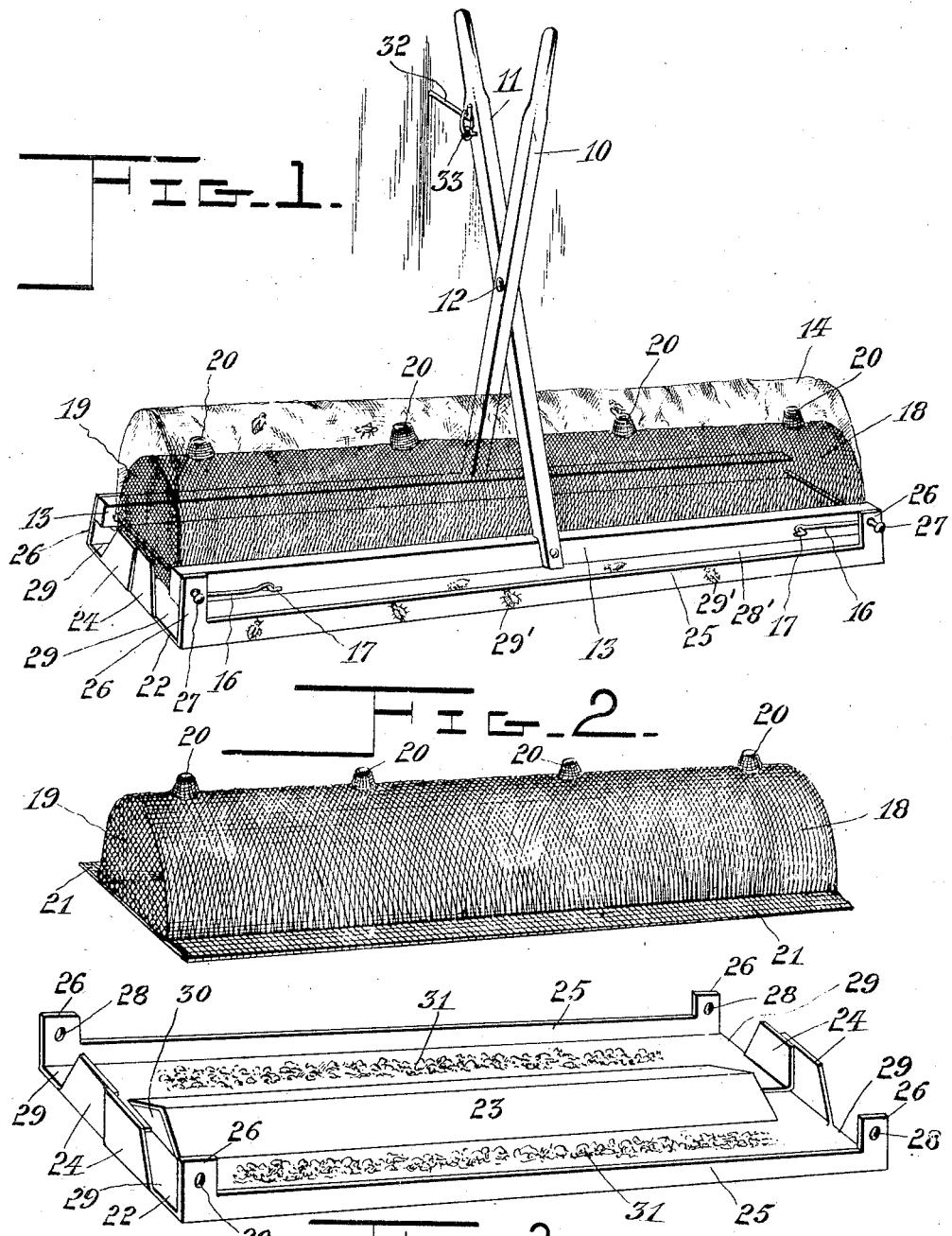

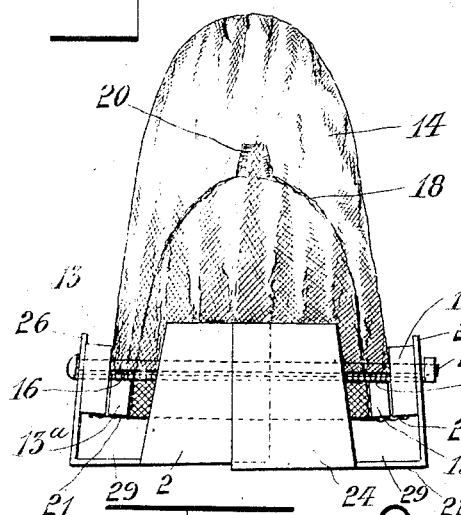
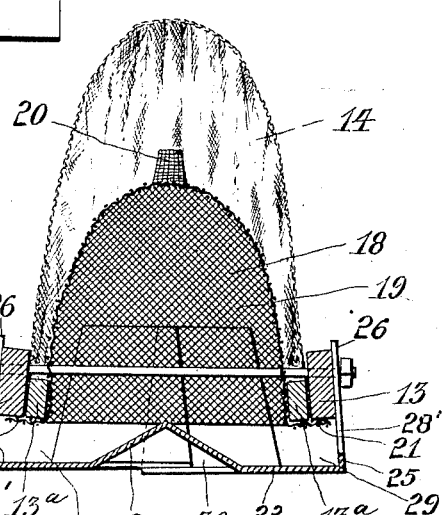
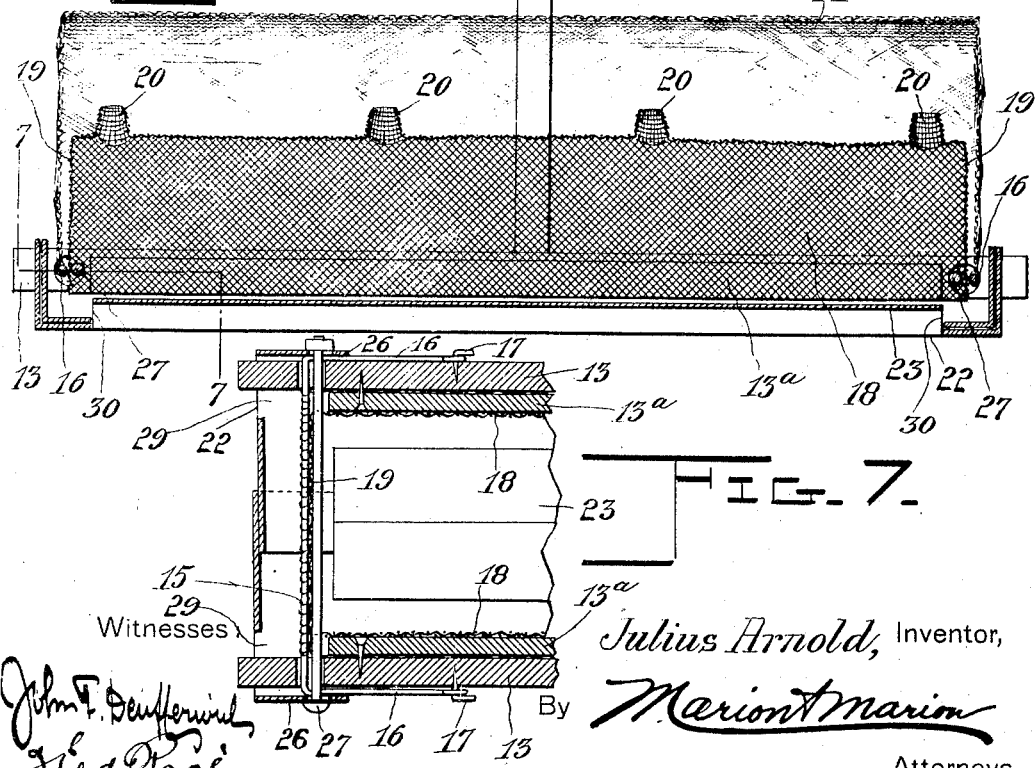

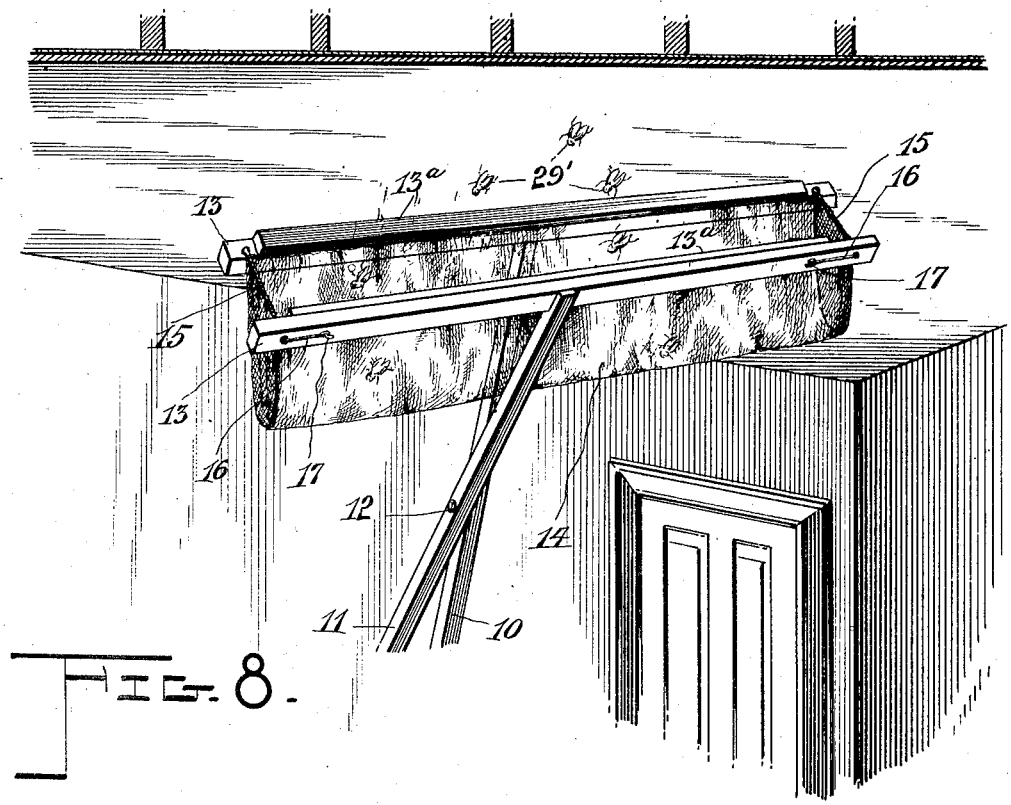
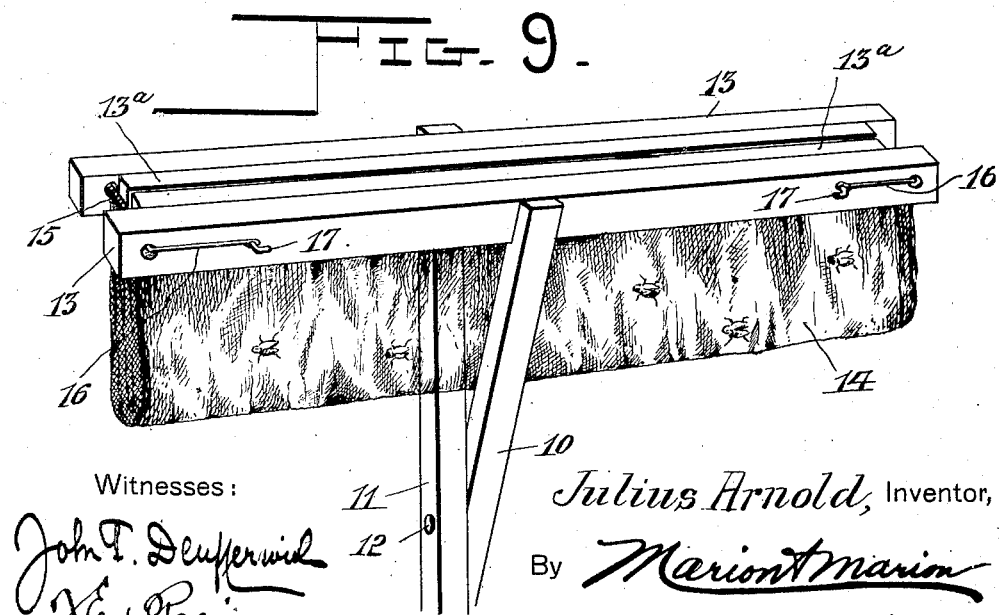

JULIUS ARNOLD, OF BRADSHAW, CANADA.

FLY-TRAP.

SPECIFICATION forming part of Letters Patent No. 714,992, dated December 2, 1902.

Application filed May 17, 1902. Serial No. 107,762. (No model.)

*To all whom it may concern:*

Be it known that I, JULIUS ARNOLD, a subject of the King of Great Britain, residing at Bradshaw, county of Lambton, Province of Ontario, Canada, have invented certain new and useful Improvements in Fly-Traps; and I do hereby declare that the following is a full, clear, and exact description of the invention, such as will enable others skilled in the art to which it appertains to make and use the same.

My invention relates to a new and improved trap, which may be used in two different ways to catch flies—that is to say, one which may be used either as a positive fly-catcher to sweep the walls and ceiling of a room free from flies or, on the other hand, when not in active use may be hung against a wall to operate as an ordinary trap into which flies are attracted by means of bait.

My invention is described in the accompanying sheets of drawings, wherein—

Figure 1 is a view of a fly-trap as hung against a wall in a position to attract and trap the flies by means of bait. Fig. 2 is a perspective view of the wire-gauze arch of the trap. Fig. 3 is a similar view of the bait-holding cover thereof. Fig. 4 is an end elevation of the trap with the shear-arms removed. Fig. 5 is a transverse cross-section of the same. Fig. 6 is a longitudinal cross-section of the trap. Fig. 7 is a detail plan section of one end of the trap, taken on the line 7 7 of Fig. 6. Fig. 8 is a sketch showing the trap when in use as a positive fly-catcher for sweeping the flies from the ceiling, and Fig. 9 is a perspective view showing the trap after the operation of Fig. 8 and in which the shear-arms are closed together to trap the flies.

The same numerals of reference denote like parts in all the figures of the drawings.

My invention consists principally of a frame formed of a pair of shear-arms 10 11, pivoted together at their centers by a pin 12 and having permanently nailed or riveted thereto at their extremities transverse longitudinal bars 13, to which are attached the various separate parts forming the remainder of the trap. To the bars 13 is tacked, by means of the strips 13ᵃ or by any other suitable means, a bag of flexible material, preferably of mosquito-netting 14, which is of sufficient depth to inclose the wire-gauze arch, to be hereinafter described, while at the same time leaving sufficient space between them to hold all the flies. The ends of the bag 14 are gathered up, as shown at 15, and attached to a cord of flexible material, preferably elastic, (shown at 16,) which cord may be suitably made from any rubber band such as is in common use, the ends of this band 16 being suitably looped over or otherwise attached to pegs or hooks 17, inserted near the ends of the transverse bars 13. The apparatus thus far described will complete the trap when used as an active sweeper for flies, as shown in Fig. 8; but for the purpose of adapting it also for use as an ordinary trap I provide a piece of foraminous material, preferably in the form of a wire-gauze receptacle 18 of arched shape corresponding to that of the bag 14 and having closed ends 19 and holes in the upper portion of sufficient size for the passage of a fly, these holes being preferably surrounded by cones 20, which may be drawn out of the material of the wire-gauze. The receptacle 18 is further formed with flanges 21 upon its lower sides, which are adapted to abut against the sides of the longitudinal bars 13 and the strips 13ᵃ, and thereover is placed a cover 22, which may be formed of tin-plate or any other suitable material bent into the form shown in Fig. 3. A T-shaped slot is formed near each end of the cover and the latter centrally bent to form an A-shaped elevation 23, the ends being subsequently bent up to form flanges 24, which are of sufficient height to cover the entrance between the cover and the wire screen. Side flanges 25 are also provided of less height than the flanges 24, and tabs 26 are formed at each corner of the flanges 25, which extend upwardly a sufficient distance for the attachment of the cover to the transverse bars 13. This is suitably effected by means of a pin or bolt 27 passing through the holes 28 in the tabs 26 and through corresponding holes in the longitudinal pieces 13 and the wire-gauze receptacle 18, whereby to hold them all in proper position. It will be seen from the drawings that when the cover 22 is in place and secured by the pin 27 a narrow slot 28' is left between the flange 25 and the bars 13 of sufficient width for the entrance of flies, while the form of the flanges 24 may also be such as to leave entrance-points 29 for flies, which are shown at 29'. A still further entrance-point for flies crawling upon the under side of the trap is formed by the apertures 30 at the ends of the A-shaped elevation 23.

In the operation of my trap bait will be placed in the interior of the cover, as shown at 31 in Fig. 3, and flies are induced to enter thereby through the apertures 28, 29, and 30. After the fly has eaten of the bait he will naturally rise straight up and land upon the interior surface of the receptacle 18, from whence crawling through the holes 20 he will finally land in an interior receptacle formed between the bag 14 and the receptacle 18 in the usual manner of fly-traps. The trap when thus used may be conveniently hung upon a peg 32 in the wall by means of a ring 33, attached to one of the legs, or other suitable suspending means and will thus be out of the way and not occupy space on floors or tables. When it is desired to use the trap as an active fly-sweeper to positively sweep away the flies, the pins 27 will be removed, thus releasing the cover 22 and the wire receptacle 18. The trap will then be turned upwardly, as shown in Fig. 8, and the shear-arms held one in each hand, while one of the bars 13 is swept along the ceiling, the other bar being held in close proximity thereto and the trap being held at a slight obliquity during this operation, so that the flies as they rise from the ceiling fly directly into the mosquito-netting bag 14, and before they have a chance to escape therefrom the operator closes together the shear-arms 10 11, so as to close the bag 14 at its open side and entrap the flies in the manner shown in Fig. 9. The trap may then be cleared of flies in the ordinary manner, either by immersing it in hot water or opening the trap out of doors or in any other convenient way.

The job of cleaning the flies from a room is thus completed in a few minutes in a manner so simple as to be easily understood and operated even by a child, while when not in use the receptacle 18 and cover 22 are again attached to the trap in the manner heretofore described, bait 31 having been previously placed in the cover.

A great advantage of this trap is that it can be conveniently hung on a wall out of the way and not occupy any floor or table space, while at the same time permitting of continual use as a trap in the ordinary manner.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. In a fly-trap, the combination of a pair of shear-arms, transverse bars attached thereto, and a bag of flexible material attached to said transverse bars.

2. A fly-trap comprising a pair of shear-arms, transverse bars attached thereto, a bag of flexible material attached to said transverse bars, a removable receptacle of perforated material adapted to fit therein and a cover therefor attached to said transverse bars having openings for the entrance of flies.

3. In a fly-trap, the combination of a pair of shear-arms, transverse bars attached thereto, a bag of flexible material attached to said transverse bars, and an elastic strap passing through holes in the ends of the bars and looped over studs and over which the ends of the bag are gathered.

4. A fly-trap comprising a pair of shear-arms, transverse bars attached thereto, a bag of flexible material attached to said transverse bars, a removable arched receptacle of wire-gauze having holes in its upper portion for the passage of flies, a cover attached to the transverse bars having a receptacle for bait and openings for the entrance of flies, and a pin passing through the bars, the wire-gauze receptacle and cover for removably attaching them together.

In witness whereof I have hereunto set my hand in the presence of two witnesses.

JULIUS ARNOLD.

Witnesses:
BEULAH A. ARNOLD,
FLOSSIE McDONALD.